Figure 2:
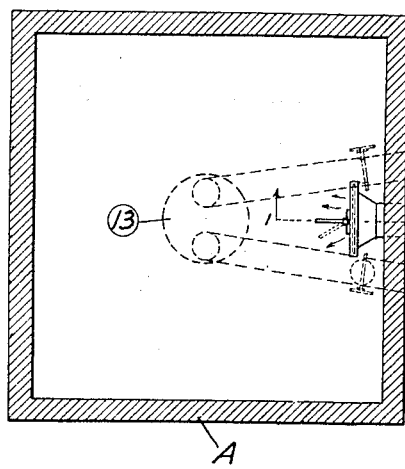
Figure 2:
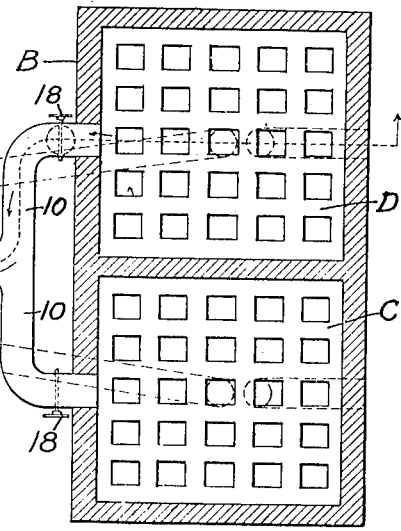

F. BATTER.
PROCESS OF CONTROLLING THE HUMIDITY OF THE ATMOSPHERE.
APPLICATION FILED MAR. 12, 1913.

1,206,977.

Patented Dec. 5, 1916.
2 SHEETS—SHEET 1.

Witnesses:

Frank Batter
Inventor,

F. BATTER.
PROCESS OF CONTROLLING THE HUMIDITY OF THE ATMOSPHERE.
APPLICATION FILED MAR. 12, 1913.
1,206,977.
Patented Dec. 5, 1916.
2 SHEETS—SHEET 2.
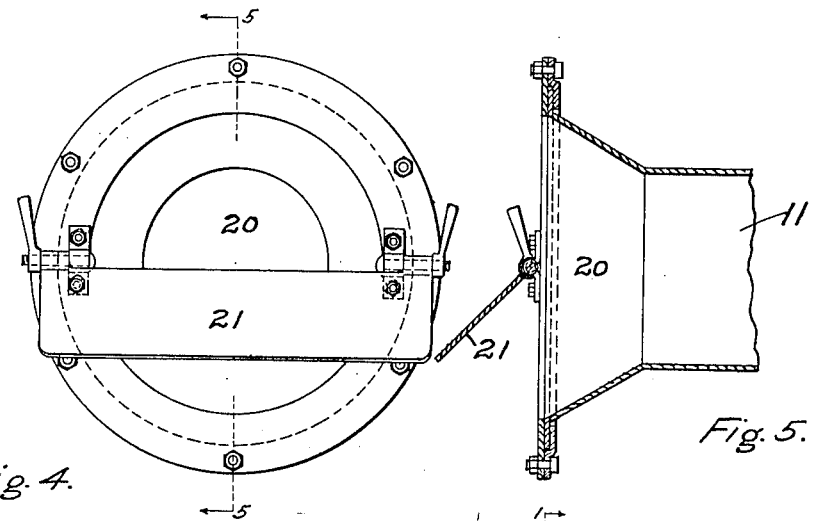
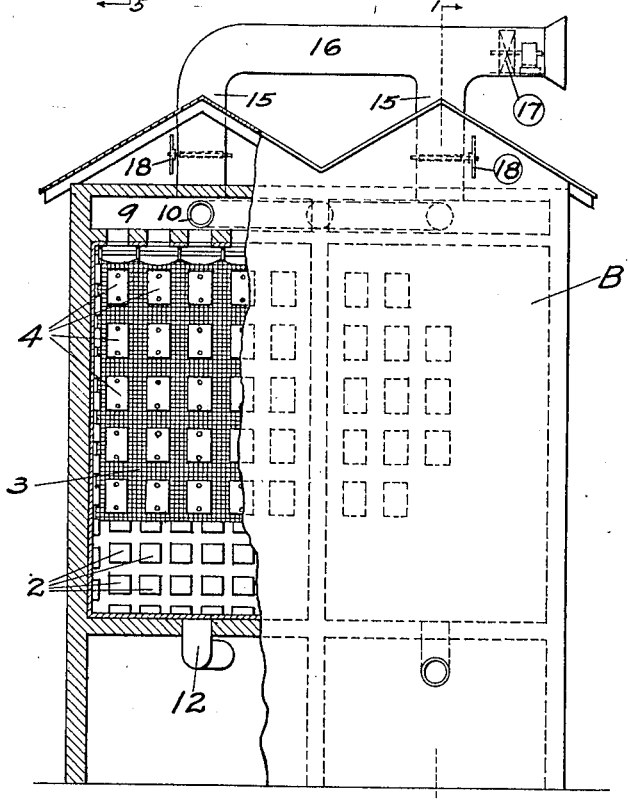
Witnesses:
J. C. Streng
W. Streng
Frank Batter
Inventor,

UNITED STATES PATENT OFFICE.

FRANK BATTER, OF LINNTON, OREGON.

PROCESS OF CONTROLLING THE HUMIDITY OF THE ATMOSPHERE.

1,206,977.  Specification of Letters Patent.  Patented Dec. 5, 1916.

Application filed March 12, 1913. Serial No. 753,854.

*To all whom it may concern:*

Be it known that I, FRANK BATTER, a citizen of the United States, residing in the town of Linnton, county of Multnomah, and State of Oregon, have invented a certain new and useful Process of Controlling the Humidity of the Atmosphere, of which the following is a specification.

The atmosphere, as is well known, is capable of being saturated with moisture, and in hygrometrical reports, as of the U. S. Weather Bureau, "complete saturation of the air is designated by humidity 100, and its partial saturation by smaller numbers". It is known, too, that human beings are mentally and physically affected by the relative humidity and temperature of the air.

In order that the merits of my process may be better understood, it should be remembered that during the fall and winter months on the northwest Pacific Coast, and near the coast, the air is moisture laden for weeks at a time, so much so that the standard hydrometer shows a moisture in the air of from 80 to 100 per cent., seldom below 90, and during the night hours the temperature runs from 35 to 50, which gives from 2 grains of water per cubic foot of air at 35 degrees, to $4\frac{1}{10}$ grains of water at 50 degrees of temperature. The large amount of cold or cool water which is thus necessarily inhaled at a temperature of from 35 to 60 degrees, must be and is, heated to about $98\frac{1}{2}$ degrees before it is exhaled, giving the lungs a heavy task to perform. Processes for drying the air in the living room by heat from a hot furnace or, still worse, from hot stoves, are objectionable since such air operates to leave the bronchial tubes and lungs in a feverish and parched state.

The object of my invention is to make possible and practical the artificial control of the humidity of air in advance of its being delivered to a living room, or other room, where a high relative humidity, or moisture laden air is undesired. I accomplish this by a process by means of which I am able to extract or take from the atmosphere of a room or inclosure most, if not all, of the moisture carried thereby, and to reduce the humidity thereof from the maximum to the minimum.

By means of my process I am able to supply a room, for any desired period, with fresh air carrying any percentage of humidity desired and to accomplish this result without the necessity of heating or changing the temperature of said air, although this can be done if desired. I accomplish this by taking the air from the outside and passing it slowly through a specially constructed and arranged inclosure which is lined or insulated, as with asbestos mill board, whereby to insure a more uniform temperature and also to avoid eddies and cross currents. In this inclosure there are hung and secured at short intervals apart from wall to wall, and from ceiling to a point near the floor, and upon the walls, blocks or pieces of specially prepared hygrometric substances which have a maximum affinity or hunger for moisture under certain conditions. These specially prepared blocks or slabs are composed of magnesium carbonate, or magnesia bricks obtained by calcination, and mixed with asbestos fibers and fire cement, and then pressed into bricks or slabs, after which they are thoroughly heated, dried, and cooled. These bricks or slabs in this condition contain a large amount of air within their fibers, which is very dry and has a great affinity for hygroscopic moisture. In other words, the dry air contained in the bricks possesses an intense hunger for moisture and is most effective in extracting the moisture from the air, providing the air moves very slowly and under an even temperature. In order to further increase their affinity or hunger for moisture, these bricks, when very dry, are placed in a brine made of common salt (sodium chlorid) and allowed to become saturated with sodium chlorid in solution, after which said bricks are again heated and thoroughly dried. They are thus rendered even more hungry for hygroscopic moisture because of the great affinity of dry salt for moisture, but the use of the salt in combination with the carbonate of magnesia and asbestos fiber bricks is principally for the purpose of equalizing the temperature of the air as it passes over the surfaces of the bricks, making the temperature of the air drying rooms more constant, which forms an important part of my process for reducing the relative humidity of the atmosphere.

The regulation of the speed at which the cool air is passed through the drying rooms is also an important part of my process. The speed of the passing air determines the amount of moisture that will be taken out of it and this can be regulated by means of suitable dampers.

In carrying out my process and in order to make it possible to have a continuous supply of the treated air, I provide two chambers or inclosures of the character referred to for extracting the moisture from the air, either one of which can be put to use while the other is being dried. From these chambers or inclosures the air is passed into the room where it is to be used. While one of said chambers or inclosures is in use extracting the moisture from the air and reducing its humidity, as hereinbefore referred to, the other chamber or inclosure, having previously been used for this same purpose, is subjected to a drying process by means of which the moisture gathered by the bricks or slabs is being carried therefrom by currents of heated air passed through said chamber or inclosure and around and over the surfaces of said bricks or slabs. By thus alternating the use of the drying chambers, using one while the other is being dried and put in condition to use again, a continuous supply of fresh cool air, deprived of its humidity to the desired percentage, can be delivered to the room to be occupied.

In order that others may fully understand my invention, I have shown in the accompanying sheets of drawings one practical apparatus for carrying out the process, which apparatus I will now describe.

Figure 1:
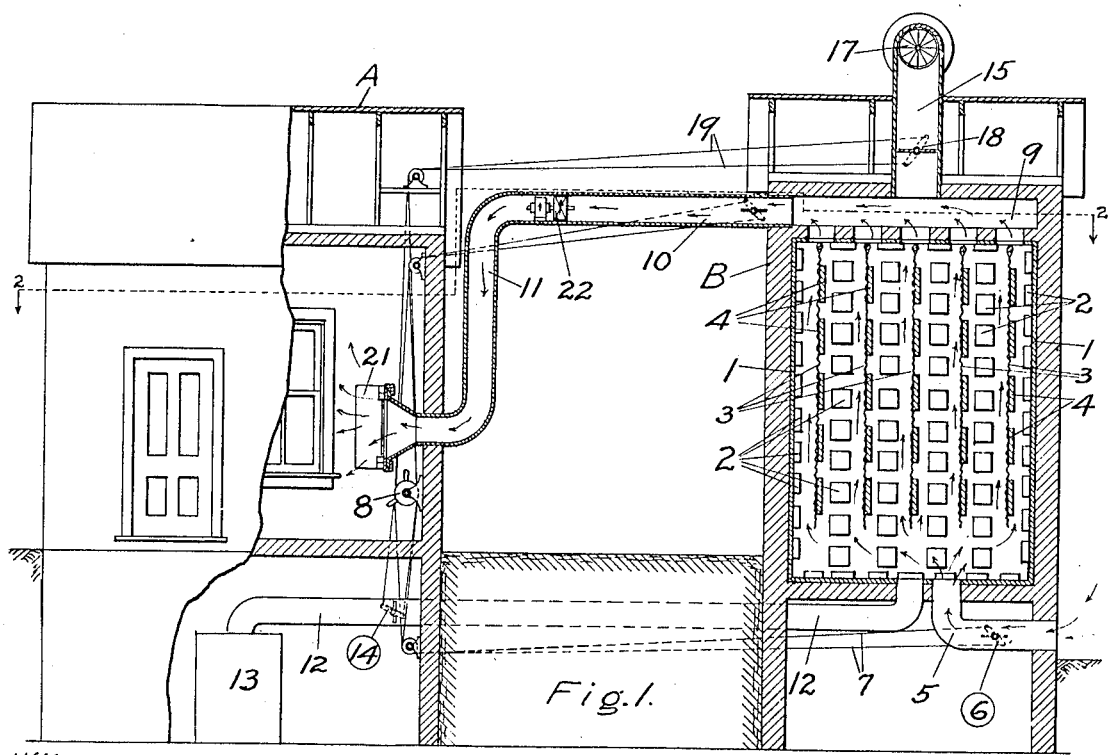

In the drawings,—Figure 1 is a side elevation, partly in section and with a part broken away, to show the room to which the treated air is delivered, and an interior view of one of the treating chambers or inclosures; Fig. 2 is a horizontal sectional view thereof; Fig. 3 is an end view of the treating chambers or inclosures with a part of the wall broken away; Fig. 4 is an end view of a form of discharge pipe for delivering the treated air to the room to be occupied, showing a deflecting vane; and Fig. 5 is a sectional view of the same.

Referring now to the drawings, A designates a structure to which the air, deprived of its humidity, is to be delivered, and B a structure in which are two treating chambers or inclosures C and D. The chambers C and D are lined with asbestos mill board, as 1, as hereinbefore referred to, and upon this lining, against the inside walls of the chamber, are secured a series of my specially prepared bricks or slabs, indicated by the numeral 2, and shown as square. Hung from the ceiling, in this form, are sheets of wire netting, as 3 upon which are secured, at intervals apart, as indicated, other bricks or slabs of this special hygrometric substance, which are indicated by the numeral 4. Both the inclosures C and D are alike and are each connected through its floor with the outside atmosphere, as by means of a pipe 5, in which is a damper 6 adapted to be operated by means of cables 7 running to an operating hand wheel and drum 8 in the room to be occupied. Said inclosures or chambers C and D are in communication, through openings in their ceilings, with chambers, as 9, above their ceilings, as indicated in Fig. 1. These chambers or spaces are connected through branch pipes, 10—10, with a common feed pipe 11, leading to the room to be occupied, in structure A.

Leading to openings through the floors of the chambers C and D are pipes, as 12, from a hot air furnace, as 13, in the basement of the structure A. Suitable dampers, as 14, are placed in the furnace pipes 12 and these are also operable by means of cables, as 13, connected with the operating drum, as at 8, or with any other operating mechanism, whereby heated air from the furnace 13, through pipe 12 to either of the chambers C or D can be cut off whenever a damper admitting fresh air (outside) to the same chamber has been opened.

Leading from the chambers or spaces 9—9 in the upper portion of the structure B, are outlet pipes 15—15, connected to a common pipe 16, provided at its discharge end with a motor fan, as 17, for creating a current outwardly through said pipes from said chambers C—D. In said pipes 15—15 are dampers, as 18—18, for shutting off the outlet from either chamber at will. These dampers are also operable by means of cables 19—19 running into the room to which the treated air is delivered and to a drum, as at 8, as before, all of said dampers being so connected that the proper inlets and outlets to and from either of the chambers C—D can be opened and closed at will. The delivery pipe 11 has a discharge opening, as at 20, into the room of structure A, and is also provided with a hingedly mounted vane, as 21, whereby the discharged air from either of the chambers C and D can be directed or deflected as it is discharged into the room, as may be desired. In the delivery pipe 11 is also mounted a motor fan, as 22, for drawing the air from either of the treating chambers C and D and causing it to move into the room of structure A.

With the apparatus, air from the outside is caused to move through either of the pipes 5 to either of the chambers C and D by means of the motor fan 22 in the delivery pipe 11, it being understood that the damper in the outlet pipe 15 above is closed. The air moves very slowly up into the chamber C, for example, passing around and over the surfaces of the bricks or slabs 2 and 4 distributed in said chamber, which attract and take up moisture from the air as it so moves.

The effectiveness of my process will be seen when it is known that the saline magnesium carbonate and asbestos blocks have shown for months to have a capacity for taking from a half to one ounce of water per pound for the material used, and still be an active moisture extractor at the end of 48, and even 60, hours, without needing drying out, and when the wind suddenly shifts and comes from the snow covered mountains at the east of the coast country, the air is suddenly changed from a mild and damp condition to a very cold and dry condition and this sudden change is very detrimental to most everyone, and especially to those whom my process is intended to help, my process again shows its merit, because just as soon as that cold dry air, which is hungry for moisture, enters the treating room on its way to the living room, it comes in contact with and takes a certain per cent. of the moisture out of the previously moisture-laden blocks in the drying room, and carries it to the living room to maintain the desired quality of air in the living room, until all the moisture has been taken out of the magnesium carbonate and asbestos block, thereby preventing any sudden change of air conditions during the sleeping hours in the sick room. Again, should the wind shift back from the east to the west and suddenly become moist, the same blocks in the drying room will begin to take out the excess of moisture instead of parting with it, making the process especially well suited for the purpose desired.

I am aware that within certain limits, slight changes can be made in the process as here described, and I do not, therefore, limit the invention except as limited by the hereto appended claims.

I claim:

1. The process of controlling the humidity of the atmosphere which consists in passing atmospheric air at its normal temperature and humidity both of which vary from time to time through a heat insulated inclosure and in contact with non-heat-conducting, hygrometric and moisture exchanging substance of fibrous character, insulating said air against change in temperature, and regulating the speed thereof to determine the percentage of moisture exchanged by said air and hygrometric substance.

2. The process of controlling the humidity of the atmosphere which consists in passing atmospheric air at its normal temperature slowly through a heat insulated inclosure and in contact with non-heat-conducting, hygrometric substance, composed of magnesium carbonate mixed with asbestos fibers and left in open or porous condition, and periodically drying said substance.

3. The process of controlling the humidity of the atmosphere which consists in passing atmospheric air at its normal temperature slowly and evenly through an inclosure, lined and filled with a non-heat-conducting, dried hygrometric substance, composed of magnesium carbonate mixed with asbestos fibers and saturated with a solution of sodium chlorid, and periodically drying said substance and the air contained in its fibers.

4. The process of controlling the humidity of the atmosphere which consists in passing the air at atmospheric temperature and while maintaining a constancy of said temperature, slowly and evenly through an inclosure whose inner space is filled with an open fibrous, hygrometric substance, impregnated with sodium chlorid to increase its affinity for moisture, and in regulating the speed of the air therethrough to determine the percentage of moisture to be extracted, and in periodically drying said substance, substantially as shown and described.

Signed at Portland, Oregon, March 6th, 1913.

FRANK BATTER.

In presenct of—
W. R. LITZENBERG,
EMMA LEMIEUX.